Oct. 14, 1941.  H. H. GORRIE  2,259,417
CONTROL SYSTEM
Filed May 5, 1937  3 Sheets-Sheet 1

INVENTOR.
HARVARD H. GORRIE
BY
ATTORNEY

Oct. 14, 1941.   H. H. GORRIE   2,259,417
CONTROL SYSTEM
Filed May 5, 1937   3 Sheets-Sheet 2
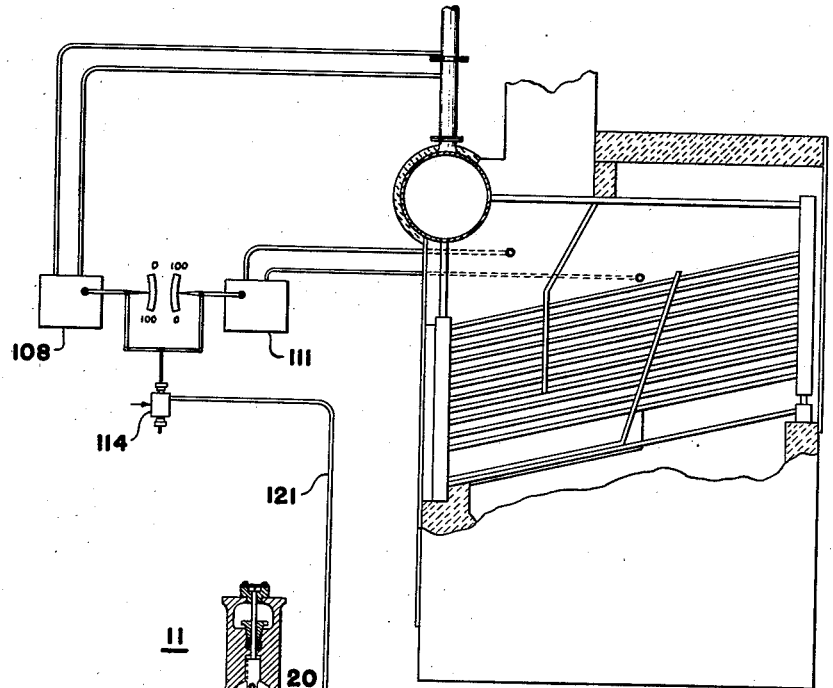
FIG. 2.
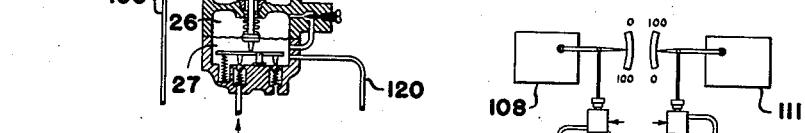
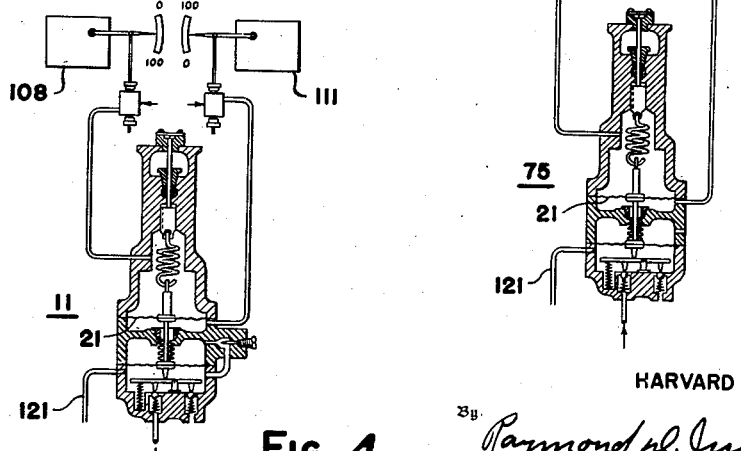
FIG. 3
FIG. 4.
Inventor
HARVARD H. GORRIE
By Raymond W. Junkins
Attorney Oct. 14, 1941.　　　H. H. GORRIE　　　2,259,417
CONTROL SYSTEM
Filed May 5, 1937　　　3 Sheets-Sheet 3
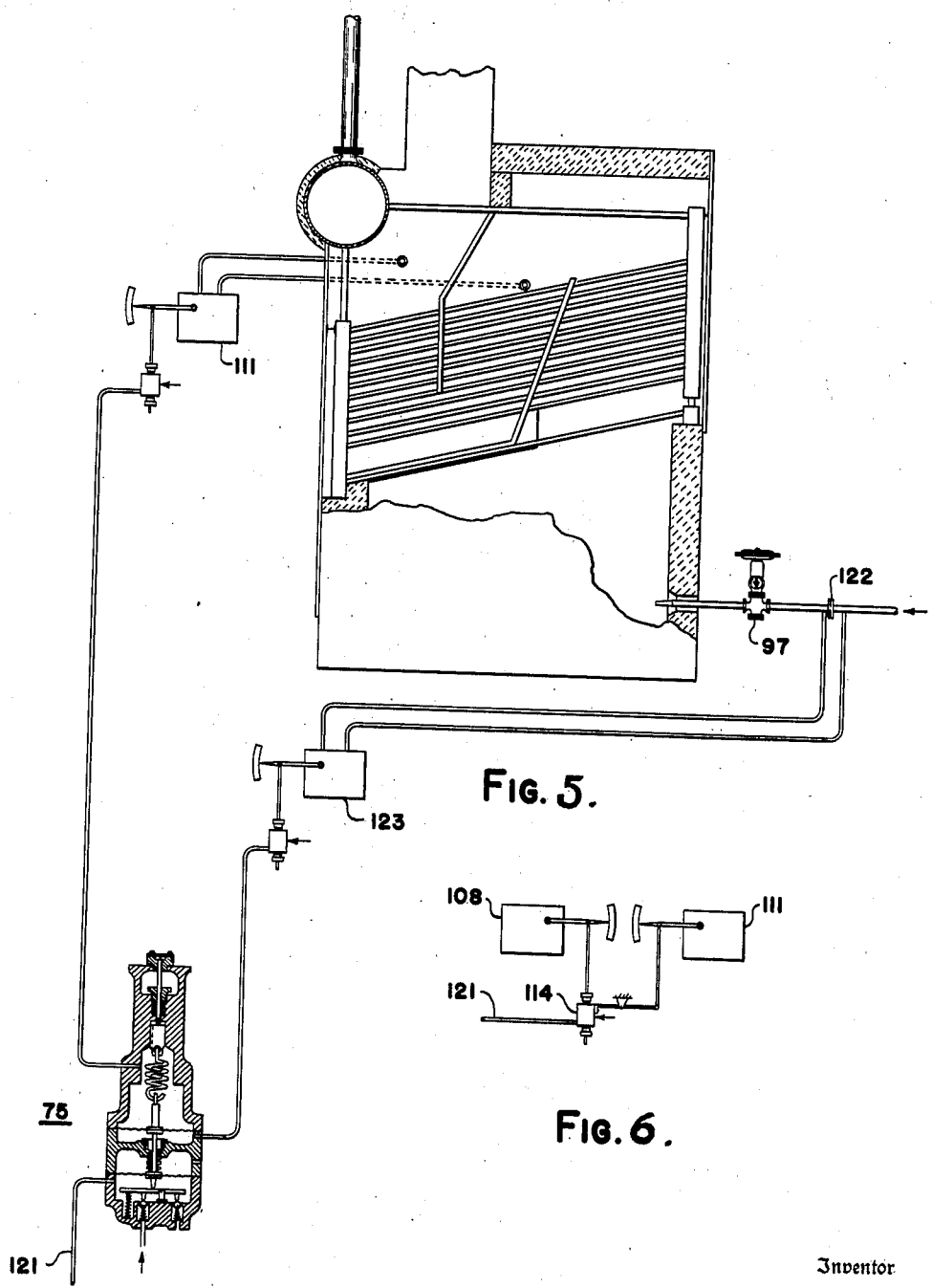
FIG. 5.
FIG. 6.
Inventor
HARVARD H. GORRIE
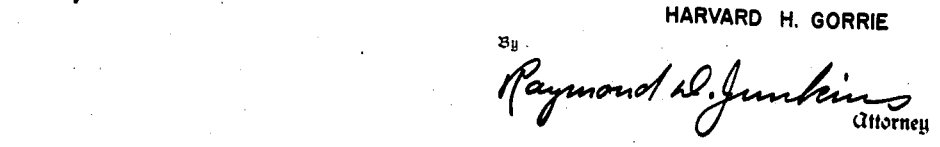
Attorney Patented Oct. 14, 1941

2,259,417

UNITED STATES PATENT OFFICE 2,259,417

CONTROL SYSTEM

Harvard H. Gorrie, Cleveland Heights, Ohio, assignor to Bailey Meter Company, a corporation of Delaware Application May 5, 1937, Serial No. 140,900

11 Claims. (Cl. 236—14)

This invention relates to control systems for establishing or maintaining substantially constant any desired electrical, thermal, chemical, physical or other variable condition through the control of a corrective agent or agents. More particularly my invention relates to control systems wherein a fluid pressure is utilized as the motive power for actuating devices to control the rate of application of corrective agents.

It is an object of my invention to provide a control system wherein the condition under control is rapidly restored to a predetermined value, upon deviation therefrom, without overtravel or hunting.

A further object is to provide a control system wherein individual units, each contributing to the production of the controlled condition may be operated at different rates, one from another, and wherein the control of the rate of supply of an agent, or agents, by the controlled condition to each unit is modified to maintain such units at highest operating efficiency.

These and other objects will be apparent from the following description and the drawings in which:

Figs. 2 and 5 show further modifications of the invention applied to a vapor generator furnace.

Figs. 3, 4 and 6 illustrate in section and diagrammatic form certain modifications of the invention.

Figure 1:
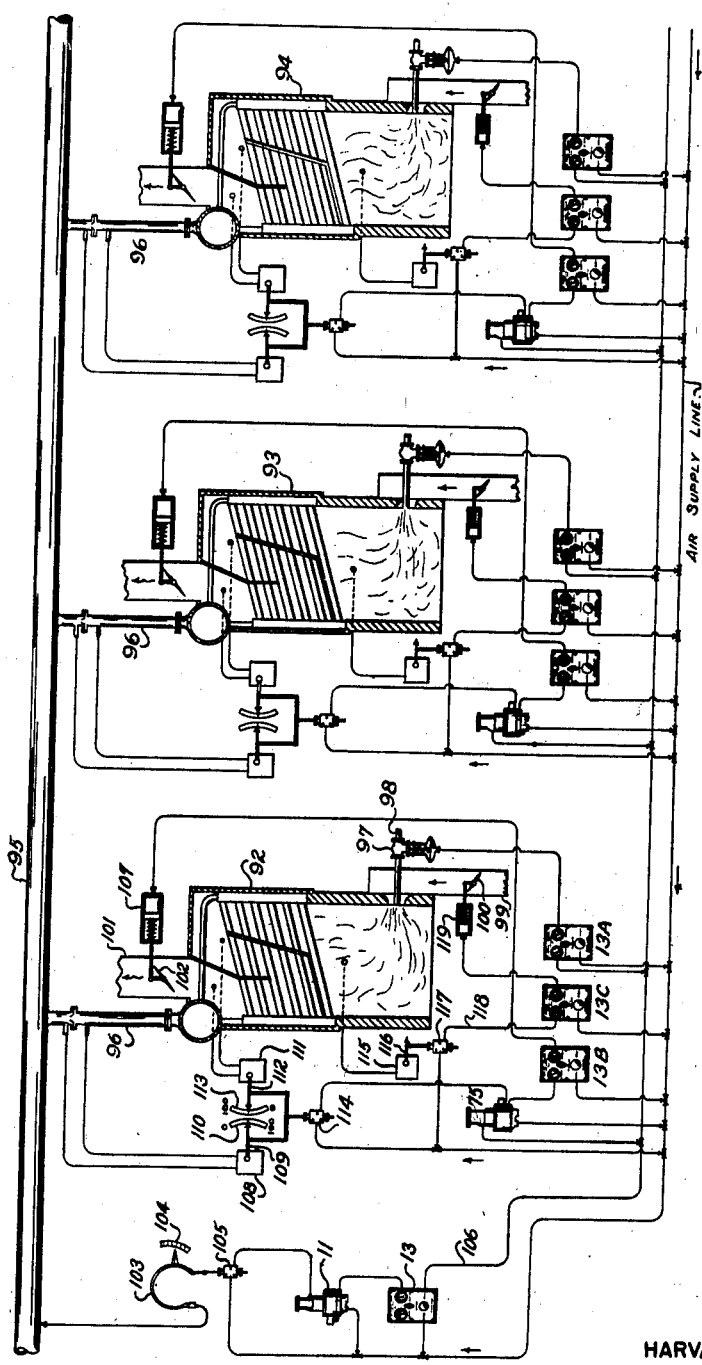
Fig. 1 is a diagrammatic representation of an arrangement to which the invention is applied.

In Fig. 1 I have shown a control system embodying my invention applied to the regulation of a vapor generating plant. In the drawings a plurality of vapor generators, 92, 93 and 94, are arranged to discharge steam into a common header 95 through steam pipes 96. The rate of fuel supply to each boiler is controlled by a valve 97, positioned in a fuel supply line 98. Air for combustion is admitted to the furnace through a duct 99, in which is positioned a damper 100 for controlling the rate of air supply. The products of combustion are withdrawn through a stack 101, in which is positioned a damper 102 for controlling the rate of discharge of the products of combustion from the generator.

The control system as illustrated operates to maintain a rate of combustion sufficient to supply the varying demands of steam, as indicated by changes in the steam pressure, and further to control the ratio of air to fuel supplied each boiler to maintain operation of the plant at maximum efficiency. A Bourdon tube 103 is arranged to indicate the pressure of the steam in cooperation with a scale 104, and also to position a pilot valve 105 of the general type disclosed in Johnson Patent 2,054,464 for establishing a fluid pressure varying inversely as the pressure of the steam within the conduit 95. Such pressure is transmitted to a standardizing relay 11, which operates as disclosed in my Patent 2,098,914 to establish a loading pressure effective for controlling the rate of supply of fuel and air to all of the boilers in unison. This loading pressure is preferably relayed through a selector valve 13 of the type disclosed in my Patent 2,202,286, so that the entire plant may be readily transferred from automatic to hand control, or the automatic control modified to suit temporary conditions. The instrumentalities comprising the Bourdon tube 103, pilot 105, standardizing relay 11, and selector switch 13, may be termed a master control inasmuch as they function to effect the operation of all of the boilers in unison, and furthermore are devoted to the maintenance of a predetermined pressure, as for upon a deviation of pressure from the desired magnitude a pressure will be established by the pilot 105 effective through the agency of the standardizing relay 11 for producing a loading pressure instantaneously varying in accordance with the deviation of pressure from the desired value, and thereafter continuing to change in a sense to restore the pressure to the desired value. The standardizing relay 11 as applied to the specific application shown in Fig. 1 acts to give an immediate corrective action proportional to the rate of change in pressure and thereafter to give a continuing corrective action proportional to the amount of deviation of the pressure from the desired value.

The loading pressure established by the standardizing relay 11, as relayed through the selector switch 13, is conducted to boilers 92, 93 and 94, through a pipe 106, and is adapted to control the actuation of a fluid pressure motor 107 positioning the damper 102 and of the fuel supply valve 97. Thus upon a decrease of vapor pressure within the conduit 95 the loading pressure established by the standardizing relay 11 will increase in unison therewith, effecting a positioning of the fuel supply valve 97 and the damper 102 to increase the rate of fuel supply and air supply to each boiler in parallel. Thereafter the loading pressure will continue to increase in proportion to the amount of deviation of the steam pressure below the desired value, and effect a further continuing positioning of the fuel supply valve 97 and damper 102 to effect a further increase in the rate of fuel and air supply to each boiler until the steam pressure is restored to the desired value.

The loading pressure established by the standardizing relay 11 effective for positioning the fuel supply valve 97 is preferably relayed through a selector valve 13A, so that the rate of fuel supply to each boiler may be readily transferred from automatic to hand control, or the control of fuel modified in accordance with local boiler conditions. As well understood in the art it is frequently desirable that one or more boilers be maintained at a constant rate of steaming, and the variations in load compensated for by varying the ratings on the remaining boilers. The provision of the individual selector valves 13A in the lines to the fuel supply valves 97 provides a means for readily maintaining any boiler at a predetermined rate of vapor generation. It is also frequently desirable that while several of the boilers vary in rating in accordance with variations in vapor usage, that some of the boilers be operated at a proportionately higher rating than the others. The selector valve 13A provides a means for readily modifying the control of fuel to provide for this arrangement.

As is well known, the ratio between fuel and air supply to the boiler must be maintained at a predetermined value for maximum operating efficiency. To furnish air in excess of the amount dictated by this ratio, or to supply it in less amount, results in a decrease in efficiency. Accordingly, an automatic control system after an adjustment of the fuel and air to satisfy a change in requirements for steam production, should readjust the supply of air if the ratio between fuel and air deviates from the value giving maximum efficiency. In the drawings I have shown a combustion control system, accomplishing this through the agency of my improved control devices. At 108 I have shown a meter of the rate of flow of steam from each of the boilers. The meter 108 is provided with an indicator 109, which in cooperation with a scale 110 will indicate the rate of flow of steam from the boiler. The indicator 109 is adapted to move downward upon an increase in the rate of flow of steam from the boiler. A similar meter 111 is provided with an indicating arm 112 adapted to cooperate with a scale 113 to measure the rate of the flow of products of combustion through the boiler. The indicating arm 112 is adapted to move upward as the rate of flow of products of combustion increases. The rate of flow of products of combustion is inherently an indication of the rate of air supplied to the boiler and the rate of flow of steam flow from the boiler is a measure of the heat supplied by the fuel. Accordingly a predetermined ratio should be maintained between the rate of flow of the products of combustion and the rate of flow of steam flow from the boiler for maximum combustion. Such a relation gage as I have herein described and shown more or less diagrammatically may be of the type shown and described in Patent No. 1,257,965 to Bailey.

The meters 108 and 111 are adapted to position a pilot valve 114 through a suitable differential linkage to establish a loading pressure in accordance with the ratio between the rate of flow of steam from the boiler and rate of flow of products of combustion through the boiler. In order that the rate of flow of air through the boiler may be varied in response to variations in vapor pressure, and also modified to maintain a predetermined relation between the fuel supply and air supply, I have found it advantageous to utilize the pressure averging relay 75 to produce a loading pressure varying in accordance with the sum of the loading pressures established in accordance with the magnitude of the steam pressure, and the loading pressure established in accordance with the ratio between fuel flow and air flow. In this particular instance I desire to add the two pressures, rather than to produce a loading pressure varying as the difference, and I so connect the pilot valve 114 and the loading pressure from the master standardizing relay 11 that the resultant pressure from the relay 75 will vary in accordance with the sum of the two pressures. This pressure is transmitted to a selector valve 13B and thence relayed to the fluid pressure motor 107. The arrangement is such that upon a decrease in pressure the loading pressure established by the master standardizing relay 11 will increase effecting a positioning of the damper 102 in an opening direction. Likewise an increase in steam flow with no corresponding increase in air flow will cause the loading pressure transmitted from the pilot 114 to increase, thus also serving to position the damper 102 in an opening direction. The pressures effective for positioning the motor 107 are preferably relayed through a selector valve 13B so that the control of air flow through the boiler may be readily transferred from automatic to hand control, or vice versa. The selector valve 13B also makes provision for modifying the control of air flow by steam pressure and the ratio of steam flow-air flow.

To maintain a predetermined furnace draft within the boiler furnace I have provided a meter 115 having an indicating arm 116 positioned in accordance with variations in furnace draft. The pilot valve 117 is positioned by the indicating arm and establishes a loading pressure varying directly with furnace draft. Upon an increase in furnace draft for example, the indicating arm 116 will move downwardly as viewed in the drawing, increasing the loading pressure in a pipe 118, connected to the selector valve 13C. The loading pressure so produced is relayed through the selector valve 13C to a fluid pressure damper operator 119. Upon an increase in furnace draft the indicating arm 116 will be positioned downwardly as viewed in the drawing, increasing the loading pressure controlling the positioning of the damper operator 119, which will position the damper 100 in a direction to increase the rate of flow of air to the furnace, thus restoring the furnace draft to the predetermined value.

In Fig. 2 I illustrate a portion of the arrangement of Fig. 1, showing one vapor generator unit, but differing from Fig. 1 in that the loading pressure established in accordance with vapor pressure and that established in accordance with the steam flow-air flow ratio are algebraically added in a standardizing relay 11. Herein the loading pressure according to steam flow-air flow relation is taken from the uppermost of the two outlet connections of the pilot valve 114 and is led to the chamber 22 in opposition to the pressure transmitted through the line 106 across a diaphragm separating chambers 20 and 22. By such an arrangement the loading pressure which varies in accordance with steam flow-air relation is in opposite sense to that described for Fig. 1, and thus is still algebraically additive with the pressure transmitted through the line 106.

An increase in steam flow with no corresponding increase in air flow will cause the loading pressure transmitted from the pilot 114 to decrease, thus also serving to position the damper 102 in an opening direction. The resultant pressure is transmitted through the pipe 120 to the motor 107, as described in connection with Fig. 1.

With the arrangement of Fig. 2 I attain the advantages previously described as to the functioning and operation of the standardizing relay 11.

In Figs. 3 and 4 I show somewhat different arrangements of producing a fluid pressure representative of the relationship between steam flow and air flow from the vapor generator. In both of these figures the steam flow meter 108 and the air flow meter 111 are each provided with a pilot valve to establish an air loading pressure representative of the flow of the particular meter. In Fig. 3 the two loading pressures are transmitted to opposite sides of the diaphragm 21, whereupon their effect is one of algebraic addition. In this figure I illustrate a pressure balancing relay 75, while in Fig. 4 I illustrate the use of a standardizing relay 11. In each case the resultant fluid loading pressure is transmitted through a pipe 121, as in Fig. 2.

In Fig. 5 I illustrate a further modification wherein a fuel flow meter 123 is responsive to a differential in pressure across an orifice 122 in the fuel supply line and is effective in establishing a loading pressure representative of fuel flow which is thereafter interrelated with an air flow representative loading pressure in a pressure balancing relay 75. In this instance, if desirable, it is of course possible to replace the pressure balancing relay 75 with a standardizing relay 11.

In Fig. 6 I illustrate that the steam flow meter 108 positions the stem of the pilot valve 114, whereas the air flow meter 111 positions the casing of the pilot valve 114, the one relative to the other, to produce in the pipe 121 a fluid loading pressure representative of the relationship between steam flow and air flow. Such loading pressure may then pass through the pipe 121 to either a pressure balancing relay 75 or a standardizing relay 11.

While in the foregoing description I have used specific apparatus to illustrate the operation of my invention and have in cases resorted to certain specific values to more clearly explain the principle of my invention, it is to be understood that I am not to be limited thereby, but that my invention is applicable to a wide variety of applications.

The present application is a continuation in part of my pending application, Serial No. 8,047, now Patent 2,098,914, filed in the United States Patent Office February 25, 1935, entitled Control systems.

What I claim as new, and desire to secure by Letters Patent of the United States, is:

1. A combustion control system for a vapor generator comprising in combination, means for producing a first fluid pressure in accordance with the magnitude of the vapor pressure, ratio determining means of the fuel and air supplied to the generator, means for producing a second fluid pressure in accordance with the deviation of the ratio from a predetermined value, means for producing a third fluid pressure in accordance with the sum of said first and second fluid pressures, and a regulator of an element of combustion controlled by said third fluid pressure.

2. A combustion control system for a vapor generator comprising in combination, means for producing primary variations in a fluid pressure proportional to changes in the pressure of the vapor generated, means actuated by said fluid pressure for producing secondary variations in the fluid pressure in accordance with the magnitude of the pressure of the vapor generated, means for producing a second fluid pressure in accordance with the ratio between the elements of combustion supplied the vapor generator, means for producing a third fluid pressure in accordance with the magnitude of said first and second fluid pressures, and regulating means for an element of combustion controlled by said third fluid pressure.

3. A combustion control system for a vapor generator comprising in combination, means for producing a first fluid pressure in accordance with the magnitude of the vapor pressure, ratio determining means of the steam flow and air supplied to the generator, means for producing a second fluid pressure in accordance with the deviation of the ratio from a predetermined value, means for producing a third fluid pressure in accordance with the algebraic sum of said first and second fluid pressures, means for modifying the third fluid pressure at a rate initially dependent upon the extent of departure of the first and second fluid pressures from predetermined relation and thereafter continuing at a steadily decreasing rate until the magnitude of the secondary variations of the third fluid pressure is in proportion to the said extent of departure, and a regulator of an element of combustion controlled by said third fluid pressure.

4. In combination with a vapor generator heated by the elements of combustion, a vapor outflow meter, a flow meter of the gaseous products of combustion, each meter individually adapted to establish a fluid loading pressure representative of the meter reading, and a pressure balancing relay to which both said fluid pressures are admitted, said relay effective in producing a third fluid pressure representative of the algebraic sum of said first two fluid pressures.

5. In combination with a vapor generator heated by the elements of combustion, a vapor outflow meter, a flow meter of the gaseous products of combustion, and a pilot valve effective in producing a fluid loading pressure under the sole control of said meters and representative of the relationship between said metered values.

6. In combination with a vapor generator heated by the elements of combustion, a vapor outflow meter, a flow meter of the gaseous products of combustion, a pilot valve having a pair of relatively movable elements adapted to establish a loading pressure corresponding to the relative positions of said elements, one of said elements movable by said vapor outflow meter, the other of said elements movable by said flow meter of the gaseous products of combustion, and regulating means of an element of combustion actuated by the loading pressure established by said pilot valve.

7. In combination with a vapor generator heated by the elements of combustion, a vapor outflow meter, a flow meter of the gaseous products of combustion, a pilot valve having a pair of relatively movable elements adapted to establish a loading pressure corresponding to the relative position of said elements, regulating means of the air supply actuated by the fluid pressure established by said pilot valve, means actuated by said first meter upon a change in vapor outflow for relatively moving said elements to produce a change in the rate of flow of the gaseous products of combustion and means actuated by said second meter to position said elements in opposite sense tending to restore said elements to their original relative positions, whereby the change in the flow of the gaseous products of combustion will correspond to the change in the rate of vapor outflow.

8. In a combustion control system for controlling the rate of supply of the elements of combustion to the furnace of a vapor generator, in combination, means sensitive to the pressure of the vapor generated, means under the control of said means for establishing a first fluid pressure in accordance with the pressure of the vapor generated, a regulator for the one of the elements of combustion positioned in accordance with the first fluid pressure, means for determining the ratio between the rate of vapor outflow and the rate of supply of an element of combustion, means for producing a second fluid pressure in accordance with the magnitude of said ratio, means for establishing a third fluid pressure in accordance with the algebraic sum of said first and second fluid pressures, and a regulator for another of the elements of combustion positioned in accordance with the third fluid pressure.

9. In a combustion control system for controlling the rate of air flow through the furnace of a vapor generator, in combination, means for determining the ratio between the rate of vapor outflow and the rate of flow of air for combustion, means actuated by said last named means for establishing a first fluid pressure in accordance with said ratio, means responsive to said first fluid pressure for establishing a second fluid pressure, regulating means of the rate of air flow under the control of said second fluid pressure, means for producing a proportionate change in said second fluid pressure upon a change in said first fluid pressure, and means for continuously varying said second fluid pressure when said first fluid pressure departs from a predetermined value whereby the rate of air flow is changed in proportion to changes in said ratio and continuously varied when said ratio is other than at a predetermined value in a sense to restore said ratio to the predetermined value.

10. In a combustion control system for controlling the rate of supply of an element of combustion to the furnace of a vapor generator, in combination, means for measuring the rate of vapor outflow from the generator, and means under the control of said last named means for producing a change in the rate of supply of said element of combustion proportionate to and simultaneous with the change in the rate of vapor outflow and for thereafter continuously varying the rate of supply of the element of combustion until a predetermined ratio exists between said last named rate and the rate of vapor outflow.

11. A combustion control system for a vapor generator comprising in combination, means for producing a first fluid pressure in accordance with the magnitude of the vapor pressure, means for determining the rate of heat liberation in the generator, means for determining the rate of air supplied the generator, means responsive to said last two named means for producing a second fluid pressure in accordance with the ratio between the rate of heat liberation and rate of air supplied the generator, means for producing a third fluid pressure in accordance with the sum of the first and second fluid pressures, and a regulator of an element of combustion controlled by said third fluid pressure.

HARVARD H. GORRIE.